United States Patent
Li et al.

(10) Patent No.: US 9,979,227 B2
(45) Date of Patent: May 22, 2018

(54) LINE INTERACTIVE UPS

(71) Applicant: EATON MANUFACTURING LP, GLASGOW, SUCCURSALE DE MORGES, Morges (CH)

(72) Inventors: Yuehui Li, Shenzhen (CN); Yuefeng Yang, Shenzhen (CN); Huali Zhang, Shenzhen (CN); Jack Gu, Shenzhen (CN)

(73) Assignee: Eaton Manufacutring LP, Glasgow, Succursale De Morges (CH)

( * ) Notice: Subject to any disclaimer, the term of this patent is extended or adjusted under 35 U.S.C. 154(b) by 127 days.

(21) Appl. No.: 15/107,332

(22) PCT Filed: Dec. 8, 2014

(86) PCT No.: PCT/CN2014/093295
§ 371 (c)(1),
(2) Date: Jun. 22, 2016

(87) PCT Pub. No.: WO2015/096613
PCT Pub. Date: Jul. 2, 2015

(65) Prior Publication Data
US 2017/0005511 A1   Jan. 5, 2017

(30) Foreign Application Priority Data
Dec. 23, 2013   (CN) .......................... 2013 1 0717600

(51) Int. Cl.
*H02J 7/00* (2006.01)
*H02J 9/00* (2006.01)
(Continued)

(52) U.S. Cl.
CPC .............. *H02J 9/06* (2013.01); *H02J 7/0068* (2013.01); *H02J 9/062* (2013.01); *H02M 7/06* (2013.01);
(Continued)

(58) Field of Classification Search
CPC ............ H02J 9/06; H02J 7/0068; H02J 9/062; H02M 7/06; H02M 7/46; H02M 7/5387; H02M 7/538
(Continued)

(56) References Cited

U.S. PATENT DOCUMENTS 5,612,580 A * 3/1997 Janonis ................... H02J 9/062
                                                     307/64
2003/0231003 A1   12/2003 Ballard et al.
2013/0076141 A1   3/2013 Paulakonis et al.

FOREIGN PATENT DOCUMENTS

CN    101123367    2/2008
CN    101295934    10/2008
(Continued)

OTHER PUBLICATIONS

Bridgeless High-Power-Factor Buck Converter, IEEE Transactions on Power Electronics, vol. 26, No. 2, Feb. 2011, pp. 602-611.
(Continued)

Primary Examiner — Carlos Amaya
(74) Attorney, Agent, or Firm — Ward and Smith, P.A.

(57) ABSTRACT

The present invention provides a line interactive UPS, which comprises an AC input, an AC output, a chargeable and dischargeable device, a DC/AC inverter, a rectifying circuit, a full-bridge inverter, a capacitor, a switch, a charger, a boost circuit and a rectifying and buck circuit. An output of the boost circuit is connected to an input of the full-bridge inverter. The rectifying and buck circuit is controlled to provide a rectified output or a rectified and voltage-decreased output. An input of the rectifying and buck circuit is connected to the AC input. The rectifying and buck circuit is operative to provide a pulsating DC to the boost circuit or the full-bridge inverter. The line interactive UPS of the present invention can provide a stable AC to the AC output and has the advantages of small size and low cost.

15 Claims, 9 Drawing Sheets

(51) Int. Cl.
     *H02J 9/06*           (2006.01)
     *H02M 7/06*         (2006.01)
     *H02M 7/46*         (2006.01)
     *H02M 7/5387*     (2007.01)
(52) U.S. Cl.
     CPC ........... *H02M 7/46* (2013.01); *H02M 7/5387* (2013.01); *H02M 7/53871* (2013.01)
(58) Field of Classification Search
     USPC .......................................................... 307/66
     See application file for complete search history.

(56) References Cited

FOREIGN PATENT DOCUMENTS

| CN | 202772647 | 3/2013 |
|---|---|---|
| WO | WO 2012/176403 A1 | 12/2012 |

OTHER PUBLICATIONS

Extended European Search Report, EP 14873436.1, dated Aug. 8, 2017, 10 pages.
International Search Report Corresponding to International Application No. PCT/CN2014/093295; dated Feb. 9, 2015; t Pages.

\* cited by examiner

LINE INTERACTIVE UPS

RELATED APPLICATIONS

The present application is a 35 U.S.C. § 371 national phase application of PCT International Application No. PCT/CN2014/093295, having an international filing date of Dec. 8, 2014, claiming priority to Chinese Patent Application No. 201310717600.5 filed Dec. 23, 2013. The disclosures of each application are incorporated herein by reference in their entireties. The above PCT International Application was published in the Chinese language as International Publication No. WO 2015/096613.

FIELD OF THE INVENTION

The present invention relates to an UPS, and particularly, to a line interactive UPS and a controlling method thereof.

BACKGROUND OF THE INVENTION

An UPS can continuously provide power supply to electrical equipments, and has been widely researched and utilized. The UPS can be classified into three types according to its operating mode: back-up type, line type and line interactive type.

The line interactive UPS directly provides mains supply to load when the mains supply is normal, and provides power to the load by a battery during the failure of the mains supply. If the voltage of the mains supply is relatively high or low, after being converted by an inverter, the output voltage of the UPS will be higher or lower than a the required voltage for the load. In order to provide a stable output voltage of the line interactive UPS, an automatic voltage regulator (AVR) is usually connected to the input for the mains supply, in order to regulate the output voltage of the UPS. The automatic voltage regulator has high reliability and wide adjustment range for the input voltage.

However, the automatic voltage regulator has a large size, a large weight, high cost and energy consumption, which directly lead to reduction of electrical energy utilization efficiency and increased cost. Therefore, it is desirable to provide an UPS which can provide stable AC voltage without the need of an AVR.

SUMMARY OF THE INVENTION

In order to resolve the above-mentioned technical problem, the present invention provides a line interactive UPS, which comprises:

an AC input and an AC output;
a chargeable and dischargeable device;
a DC/AC inverter, an input of which is connected across the chargeable and dischargeable device;
a rectifying circuit, an input of which is connected to an output of the DC/AC inverter;
a full-bridge inverter, an input of which is connected to an output of the rectifying circuit;
a capacitor, the two terminals of which are connected to the input of the full-bridge inverter;
a switch, which is controlled to connect the AC input or an output of the full-bridge inverter to the AC output;
a charger, an input of which is connected to the AC output, and an output of which is connected across the chargeable and dischargeable device;
a boost circuit, an output of which is connected to the input of the full-bridge inverter; and a rectifying and buck circuit, which is controlled to provide a rectified output or a rectified and voltage-decreased output, wherein an input of the rectifying and buck circuit is connected to the AC input, and the rectifying and buck circuit is operative to provide a pulsating DC to the boost circuit or the full-bridge inverter.

Preferably, the rectifying and buck circuit comprises a bi-directional switch, a first full-bridge rectifying circuit and an inductor, wherein the first full-bridge rectifying circuit includes an input and an output, the AC input is connected to the input of the first full-bridge rectifying circuit via the bi-directional switch, a terminal of the inductor is connected to the positive of the output of the first full-bridge rectifying circuit.

Preferably, the bi-directional switch comprises a first metal-oxide-semiconductor field-effect transistor having an anti-parallel diode and a second metal-oxide-semiconductor field-effect transistor having an anti-parallel diode, the source of the first metal-oxide-semiconductor field-effect transistor is connected to the source of the second metal-oxide-semiconductor field-effect transistor, the drain of the second metal-oxide-semiconductor field-effect transistor is connected to the anode of a third diode, the drain of the first metal-oxide-semiconductor field-effect transistor is connected to a terminal of the AC input.

Preferably, the inductor constitutes a part of the boost circuit, which increases voltage through the inductor.

Preferably, the rectifying and buck circuit comprises a first full-bridge rectifying circuit and a buck circuit, the first full-bridge rectifying circuit includes an input and an output, the input of the first full-bridge rectifying circuit is connected to the AC input, the output of the first full-bridge rectifying circuit connecting to an input of the buck circuit, an output of the buck circuit acts as an output of the rectifying and buck circuit.

Preferably, the rectifying circuit comprises a second full-bridge rectifying circuit, the first full-bridge rectifying circuit and the second full-bridge rectifying circuit share two diodes.

Preferably, the chargeable and dischargeable device comprises a protection switch, a storage capacitor and a chargeable and dischargeable battery, wherein the protection switch and the chargeable and dischargeable battery are connected in series, and are then connected in parallel to the storage capacitor.

A embodiment of the present invention provides a controlling method of the line interactive UPS, when the voltage of the AC input is greater than the required voltage for the AC output, the switch is controlled to connect the output of the full-bridge inverter to the AC output, the DC/AC inverter stops working, the rectifying and buck circuit is controlled to rectify an AC of the AC input and decrease the voltage of the AC and provide a pulsating DC to the full-bridge inverter, and the full-bridge inverter is controlled to work in pulse width modulation mode so as to provide the required AC to the AC output.

Another embodiment of the present invention provides a controlling method of the line interactive UPS, when the voltage of the AC input is less than the required voltage for the AC output, the switch is controlled to connect the output of the full-bridge inverter to the AC output, the DC/AC inverter stops working, the rectifying and buck circuit is controlled to rectify an AC of the AC input and provide a pulsating DC to the boost circuit, and the boost circuit and the full-bridge inverter are controlled to work in pulse width modulation mode so as to provide the required AC to the AC output.

Another embodiment of the present invention provides a controlling method of the line interactive UPS, when the voltage of the AC input is greater than the required voltage for the AC output and the AC output is connected to a capacitive load requiring a power which is less than the power provided by the AC input, the switch is controlled to connect the output of the full-bridge inverter to the AC output, the full-bridge inverter is controlled to work in pulse width modulation mode, the charger is controlled to charge the chargeable and dischargeable device, and the following two steps are performed alternately:

controlling the DC/AC inverter to stop working, controlling the rectifying and buck circuit to rectify an AC of the AC input and decrease the voltage of the AC and provide a pulsating DC to the full-bridge inverter, such that the voltage across the chargeable and dischargeable device increases from a first threshold voltage to a second threshold voltage which is greater than the first threshold voltage, and providing the required voltage to the AC output;

controlling the rectifying and buck circuit to stop working, controlling the DC/AC inverter to work in pulse width modulation mode, such that the voltage across the chargeable and dischargeable device decreases from the second threshold voltage to the first threshold voltage, and providing the required voltage to the AC output.

Another embodiment of the present invention provides a controlling method of the line interactive UPS, when the voltage of the AC input is less than the required voltage for the AC output and the AC output is connected to a capacitive load requiring a power which is less than the power provided by the AC input, the switch is controlled to connect the output of the full-bridge inverter to the AC output, the full-bridge inverter is controlled to work in pulse width modulation mode, the charger is controlled to charge the chargeable and dischargeable device, and the following two steps are performed alternately:

controlling the DC/AC inverter to stop working, controlling the rectifying and buck circuit to rectify an AC of the AC input and provide a pulsating DC to the boost circuit, such that the voltage across the chargeable and dischargeable device increases from a first threshold voltage to a second threshold voltage which is greater than the first threshold voltage, controlling the boost circuit to work in pulse width modulation mode and providing the required AC to the AC output;

controlling the rectifying and buck circuit to stop working, controlling the DC/AC inverter to work in pulse width modulation mode, such that the voltage across the chargeable and dischargeable device decreases from the second threshold voltage to the first threshold voltage, and providing the required AC to the AC output.

The line interactive UPS of the present invention can provide a stable AC at the output, with simple circuit structure, fewer components and reduced cost, and improve the utilization efficiency of electrical energy. According the controlling method of the line interactive UPS, the UPS of the present invention can be applied to any kind of loads, avoids the distortion of output waveform, and avoids a large inrush current which may damage the inverter of the UPS.

BRIEF DESCRIPTION OF THE DRAWINGS

Below, embodiments of the present invention are described in detail with reference to the drawings, wherein.

REFERENCE SYMBOLS

1 DC/AC inverter
2 charger
3 electromagnetic interference (EMI) filter
4 boost circuit
5 full-bridge inverter
6 full-bridge rectifying circuit
7,8 cable
9 bi-directional switch
10 capacitive load
11 full-bridge rectifying circuit
13 buck circuit
14 rectifying circuit
15 rectifying and buck circuit
16 boost circuit
19 chargeable and dischargeable device
20 AC input
21 rectifying and buck circuit
22 full-bridge rectifying circuit
30 AC output
S, S1 switch
C capacitor
T1-T8 metal-oxide-semiconductor field-effect transistor
D1-D12 diode
L1, L2 inductor

DETAILED DESCRIPTION OF THE INVENTION

In order to make the objects, technical solutions and advantages of the present invention more apparent, the present invention is further described in detail by using the specific embodiments below, with reference to the drawings. It should be understand that the specific embodiments described herein are only used for explaining the present invention, and are not intended to limit the present invention.

Figure 1:
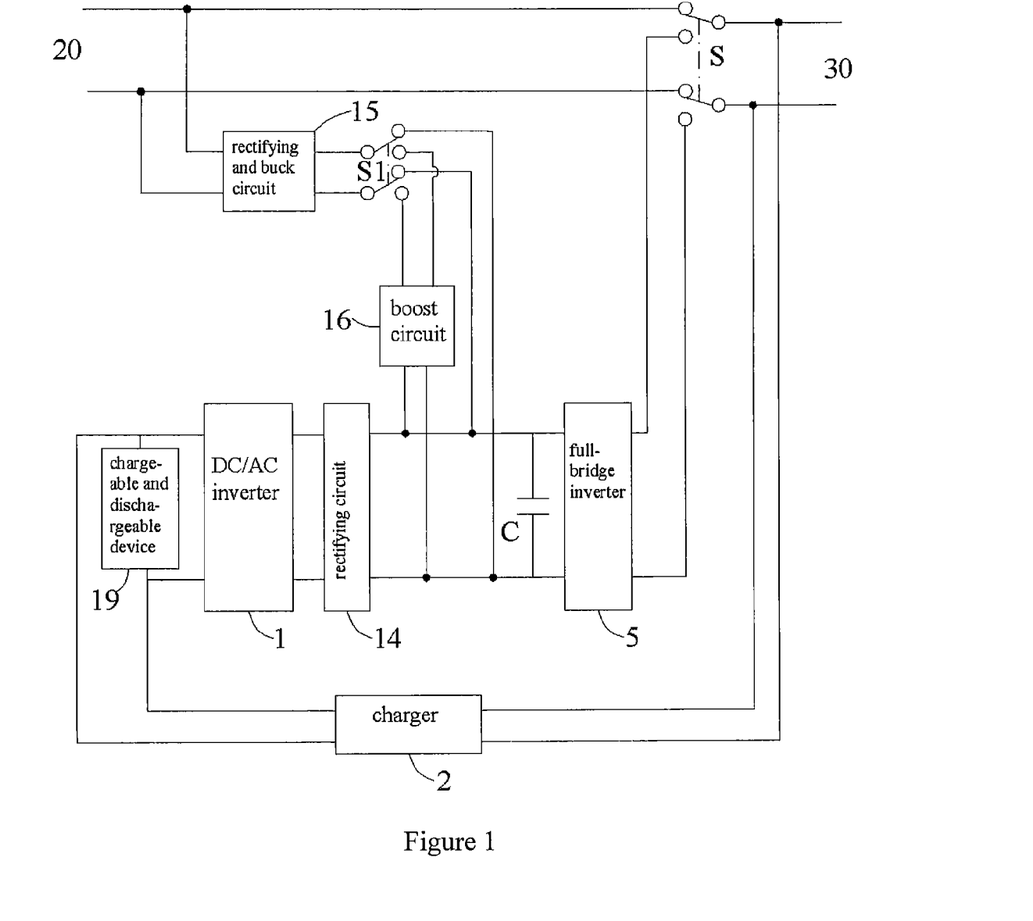
FIG. 1 is a block diagram of a line interactive UPS of the present invention.

FIG. 1 is a block diagram of a line interactive UPS of the present invention. As shown in FIG. 1, the line interactive UPS of the present invention comprises an AC input 20, an AC output 30, a chargeable and dischargeable device 19, a DC/AC inverter 1, a rectifying circuit 14, a rectifying and buck circuit 15, a boost circuit 16, a capacitor C, a full-bridge inverter 5, a charger 2, a switch S and a switch S1. The input of the DC/AC inverter 1 is connected across the chargeable and dischargeable device 19 and is configured to convert a DC of the chargeable and dischargeable device 19 into an AC. The output of the DC/AC inverter is connected to the input of the rectifying circuit 14, the output of which is connected to the input of the full-bridge inverter 5. The input of the rectifying and buck circuit 15 is connected to the AC input 20. The rectifying and buck circuit 15 is configured to rectify the AC of the AC input 20 and decrease the voltage of the AC, and output the resulting AC to the input of the full-bridge inverter 5, or rectify the AC of the AC input 20 and output the resulting AC to the input of the boost circuit 16. The output of the boost circuit 16 is connected to the input of the full-bridge inverter 5. The switch S is configured to selectively connect the AC input 20 or the output of the full-bridge inverter 5 to the AC output 30. The input of the full-bridge inverter 5 is connected across the capacitor C. The input of the charger 2 is connected to the AC output 30, and the output of the charger 2 is connected across the chargeable and dischargeable device 19, in order to charge the chargeable and dischargeable device 19 with the AC of the AC output 30.

The chargeable and dischargeable device 19 can be a chargeable and dischargeable battery or battery pack. It can also be a combination of a chargeable and dischargeable battery or battery pack, a protection switch and a capacitor or capacitor pack, wherein the chargeable and dischargeable battery or battery pack and the protection switch are connected in series, and are then connected in parallel to the capacitor or capacitor pack. When the charging and discharging process of the chargeable and dischargeable device 19 is frequent, the paralleled capacitor or capacitor pack can be frequently charged and discharged, thereby reducing the charge and discharge times of the battery or battery pack, and thus protecting the battery or battery pack effectively.

When the voltage of the AC input 20 is equal to the required voltage of the AC output 30, the AC input 20 is directly connected to the AC output 30. In this case, if the voltage across the chargeable and dischargeable device 19 is less than rated voltage of the chargeable and dischargeable device 19, the charger 2 is controlled to charge the chargeable and dischargeable device 19. When the voltage across the chargeable and dischargeable device 19 becomes equal to the rated voltage, the charger 2 is controlled to stop charging.

When there does not exist an AC at the AC input 20, the switch S is controlled such that the output of the full-bridge inverter 5 is connected to the AC output 30, the DC/AC inverter 1 is controlled such that the chargeable and dischargeable device 19 discharges and outputs an AC, and the full-bridge inverter 5 is controlled to work in pulse width modulation mode so as to provide the required AC to the AC output 30.

When the voltage of the AC input 20 is greater than the required voltage of the AC output, the switch S is controlled such that the output of the full-bridge inverter 5 is connected to the AC output 30, the DC/AC inverter 1 stops working, the rectifying and buck circuit 15 is controlled to rectify the AC of the AC input 20 and decrease the voltage of the AC, and output the resulting AC to the input of the full-bridge inverter 5 via the switch S1, and the full-bridge inverter 5 is controlled to work in pulse width modulation mode so as to provide the required AC to the AC output 30.

When the voltage of the AC input 20 is less than the required voltage of the AC output 30, the switch S is controlled such that the output of the full-bridge inverter 5 is connected to the AC output 30, the DC/AC inverter 1 stops working, the rectifying and buck circuit 15 is controlled to rectify the AC of the AC input 20 and output it to the input of the boost circuit 16 via the switch S1, and the boost circuit 16 and the full-bridge inverter 5 are controlled to work in pulse width modulation mode so as to provide the required AC to the AC output 30. In this state, the rectifying and buck circuit 15 only provides rectifying effect, without decreasing the voltage.

When the UPS operates in the above two line modes, the AC output 30 may be connected with a resistive load, capacitive load or no load.

When the voltage of the AC input 20 is greater than the required voltage for the AC output 30 and the AC output 30 is connected to a capacitive load requiring a power which is less than the power provided by the AC input 20, the switch S is controlled such that the output of the full-bridge inverter 5 is connected to the AC output 30, the full-bridge inverter 5 is controlled to work in pulse width modulation mode, the charger 2 is controlled to charge the chargeable and dischargeable device 19, and the following two steps are performed alternately:

Controlling the DC/AC inverter 1 to stop working, controlling the rectifying and buck circuit 15 to rectify the AC of the AC input 20 and decrease the voltage of the AC, and output the resulting AC to the input of the full-bridge inverter 5, such that the voltage across the chargeable and dischargeable device 19 increases from a first threshold voltage to a second threshold voltage which is greater than the first threshold voltage, and providing the required voltage to the AC output 30;

Controlling the rectifying and buck circuit 15 to stop working, controlling the DC/AC inverter 1 to work in pulse width modulation mode, such that the voltage across the chargeable and dischargeable device 19 decreases from the second threshold voltage to the first threshold voltage, and providing the required voltage to the AC output 30.

When the voltage of the AC input 20 is less than the required voltage for the AC output 30 and the AC output 30 is connected to a capacitive load requiring a power which is less than the power provided by the AC input 20, the switch S is controlled such that the output of the full-bridge inverter 5 is connected to the AC output 30, the full-bridge inverter 5 is controlled to work in pulse width modulation mode, the charger 2 is controlled to charge the chargeable and dischargeable device 19, and the following two steps are performed alternately:

Controlling the DC/AC inverter 1 to stop working, controlling the rectifying and buck circuit 15 to rectify the AC of the AC input 20 and output it to the input of the boost circuit 16, such that the voltage across the chargeable and dischargeable device 19 increases from a first threshold voltage to a second threshold voltage which is greater than the first threshold voltage, controlling the boost circuit 16 to work in pulse width modulation mode, and providing the required AC to the AC output 30;

Controlling the rectifying and buck circuit 15 to stop working, controlling the DC/AC inverter 1 to work in pulse width modulation mode, such that the voltage across the chargeable and dischargeable device 19 decreases from the second threshold voltage to the first threshold voltage, and providing the required AC to the AC output 30.

Those skilled in the art can understand that the DC/AC inverter 1, the charger 2, the rectifying circuit 14, the rectifying and buck circuit 15, the boost circuit 16, the full-bridge inverter 5, the chargeable and dischargeable device 19 illustrated in the FIG. 1 may take any form of circuit known in the art which can achieve its function, so as to achieve the above operating modes. The rectifying and buck circuit 15 can achieve the function of converting an AC to a DC, and is operative to provide a voltage-decreased DC.

Figure 2:
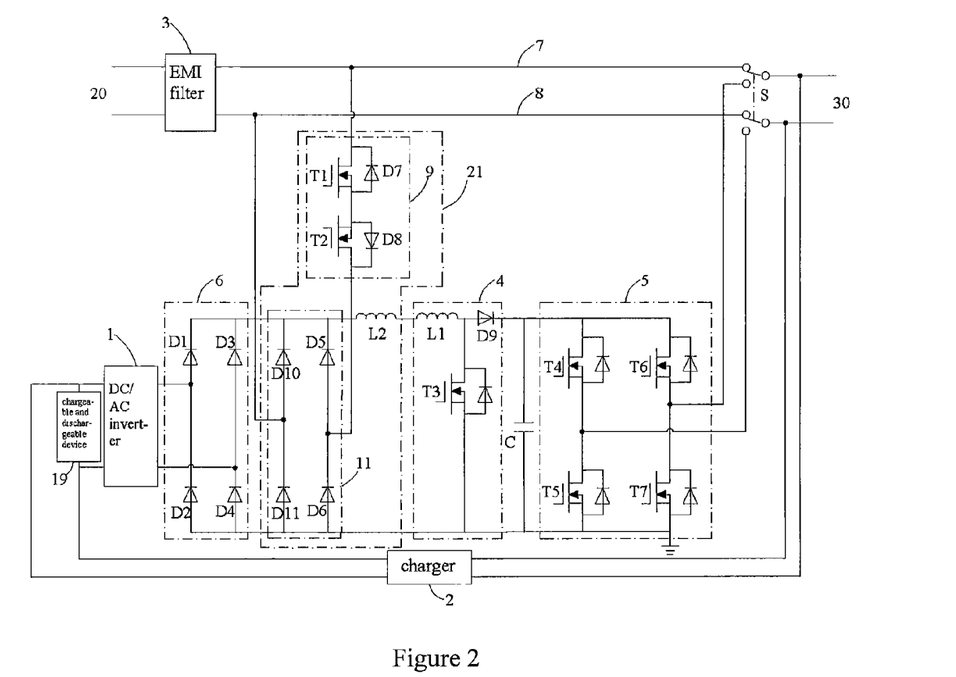
FIG. 2 is a circuit diagram of a line interactive UPS of a first embodiment of the present invention.

FIG. 2 is a circuit diagram of a line interactive UPS of a preferred embodiment of the present invention. As shown in FIG. 2, the input of the DC/AC inverter 1 is connected across the chargeable and dischargeable device 19, the output of the DC/AC inverter 1 is connected to the input of a full-bridge rectifying circuit 6. The full-bridge rectifying circuit 6 comprises diodes D1-D4, wherein the anodes of the diodes D and D act as an input of the full-bridge rectifying circuit 6, and the cathode of the diode D1 and the anode of the diode D2 act as an output of the full-bridge rectifying circuit 6. The cathode of the diode D1 is defined as a positive or positive terminal of the output of the full-bridge rectifying circuit 6, and the anode of the diode D2 is defined as a negative or negative terminal of the output of the full-bridge rectifying circuit 6. The boost circuit 4 comprises an inductor L1, a diode D9, a metal-oxide-semiconductor field-effect transistor T3, wherein one terminal of the inductor L1 and the source of the metal-oxide-semiconductor field-effect transistor T3 act as an input of the boost circuit 4, the input of which is connected to the output of the full-bridge rectifying circuit 6. The cathode of the diode D9 and the source of the metal-oxide-semiconductor field-effect transistor T3 act as an output of the boost circuit 4. The full-bridge inverter 5 comprises metal-oxide-semiconductor field-effect transistors T4-T7, wherein the metal-oxide-semiconductor field-effect transistors T4 and T5 are connected and act as a bridge arm, the metal-oxide-semiconductor field-effect transistors T6 and T7 are connected and act as another bridge arm, the drain of the metal-oxide-semiconductor field-effect transistor T4 and the source of the metal-oxide-semiconductor field-effect transistor T5 act as an input of the full-bridge inverter 5 which connects to the output of the boost circuit 4, the source of the metal-oxide-semiconductor field-effect transistor T4 and the source of the metal-oxide-semiconductor field-effect transistor T6 act as an output of the full-bridge inverter 5. A cable 7 and a cable 8 act as an electrical connection loop between the AC input 20 and the AC output 30, wherein the AC input 20 is connected to the mains supply and the AC output 30 is connected to a load (not shown). An electro-magnetic interference (EMI) filter 3 is connected between the AC input 20 and the AC output 30, and is configured to filter harmful high frequency noise in the mains supply. A switch S is connected between the EMI filter 3 and the AC output 30, and is controlled to selectively connect the AC input 20 or the output of the full-bridge inverter 5 to the AC output 30. A rectifying and buck circuit 21 comprises a bi-directional switch 9, a full-bridge rectifying circuit 11 and an inductor L2. The bi-directional switch 9 comprises a metal-oxide-semiconductor field-effect transistor T1 having an anti-parallel diode is D7 and a metal-oxide-semiconductor field-effect transistor T2 having an anti-parallel diode D8. The source of the metal-oxide-semiconductor field-effect transistor T1 is connected to the source of the metal-oxide-semiconductor field-effect transistor T2, the drain of the metal-oxide-semiconductor field-effect transistor T2 is connected to the anode of the diode D5, the drain of the metal-oxide-semiconductor field-effect transistor T1 is connected to the cable 7 which connects between the EMI filter 3 and the switch S, the anode of a diode D10 is connected to the cable 8 which connects between the EMI filter 3 and the switch S. The full-bridge rectifying circuit 11 comprises a diode D5, D6, D10 and D11. A terminal with higher voltage of an output of the full-bridge rectifying circuit 11 is defined as its positive terminal or positive. The cable 7 and cable 8 are connected to the input of the full-bridge rectifying circuit 11 via the bi-directional switch 9. One terminal of the inductor L2 is connected to the positive terminal of the full-bridge rectifying circuit 11, and the other terminal of the inductor L2 and the other terminal of the output of the full-bridge rectifying circuit 11 act as the output of the rectifying and buck circuit 21. The input of the charger 2 is connected to the AC output 30, and the output of the charger 2 is connected across the chargeable and dischargeable device 19. The charger 2 is configured to charge the chargeable and dischargeable device 19 with electric energy of the AC output 30 when the charger is in operation.

In other embodiment of the present invention, the bi-directional switch 9 may be replaced with a bi-directional thyristor, and the switch S may be any other switch which can achieve switching, for example, a relay. In a further embodiment, a line interactive UPS may exclude the EMI filter 3.

The operating principle and controlling method of the line interactive UPS shown in FIG. 2 will be described below with reference to FIGS. 3-8.

Figure 3:
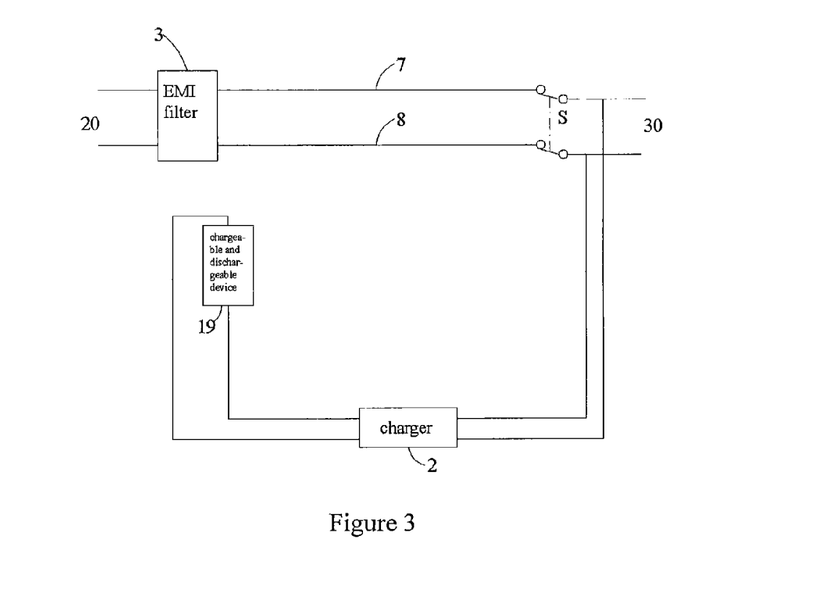
FIG. 3 is an equivalent circuit diagram of the line interactive UPS shown in FIG. 2 in the bypass mode.

FIG. 3 is an equivalent circuit diagram of the line interactive UPS shown in FIG. 2 in the bypass mode. When the voltage of the AC input 20 is equal to the required voltage of the AC output 30, which indicates the mains supply is normal, the switch S is controlled such that the AC input 20 connects to the AC output 30, the bi-directional switch 9 is disconnected, the DC/AC inverter 1, the boost circuit 4 and the full-bridge inverter 5 are controlled to stop working, thus the AC input 20 is directly supplied to the AC output 30. If the voltage across the chargeable and dischargeable device 19 is less than its rated voltage or a percentage of the rated voltage, the charger 2 is controlled to charge the chargeable and dischargeable device 19. When the voltage across the chargeable and dischargeable device 19 is equal to the rated voltage or a percentage of the rated voltage, the charger 2 stops working.

Figure 4:
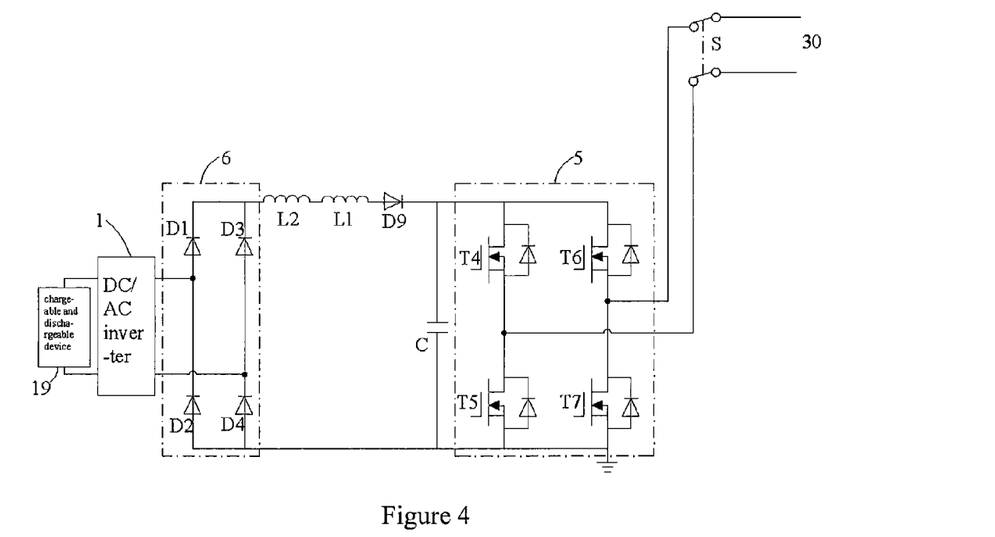
FIG. 4 is an equivalent circuit diagram of the line interactive UPS shown in FIG. 2 in the back-up mode.

FIG. 4 is an equivalent circuit diagram of the line interactive UPS shown in FIG. 2 in the back-up mode. In the back-up mode, the mains supply fails and cannot provide AC. In this case, the switch S is controlled such that the output of the full-bridge inverter 5 is connected to the AC output 30, the bi-directional switch 9 is disconnected, the metal-oxide-semiconductor field-effect transistor T3 is in the off state such that the boost circuit 4 stops working, the DC/AC inverter 1 is controlled to work in pulse width modulation mode so as to convert DC of the chargeable and dischargeable device 19 into AC, which is then rectified by the full-bridge rectifying circuit 6 to provide a pulsating DC at the input of the full-bridge inverter 5, and the full-bridge inverter 5 is controlled to work in pulse width modulation mode so as to provide the required AC to the AC output 30. Therefore, the AC output 30 can be powered by the chargeable and dischargeable battery B in the backup mode.

Figure 5:
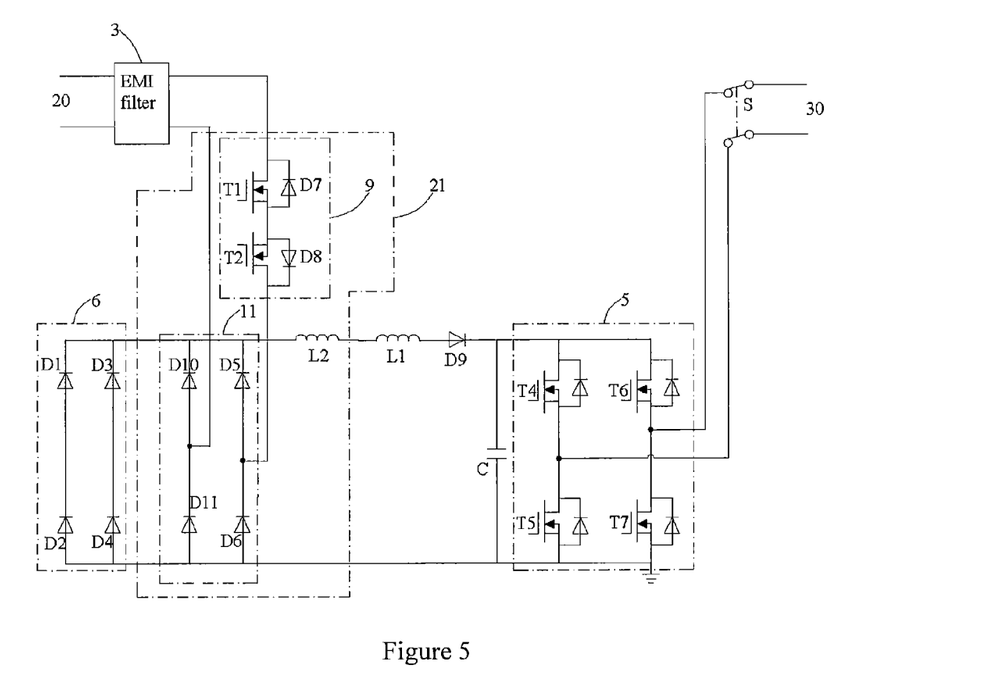
FIG. 5 is an equivalent circuit diagram of the line interactive UPS shown in FIG. 2 in the line mode to decrease voltage.

FIG. 5 is an equivalent circuit diagram of the line interactive UPS shown in FIG. 2 in the line mode to decrease voltage. When the voltage of the AC input 20 is greater than the required voltage of the AC output 30, the switch S is controlled such that the output of the full-bridge inverter 5 is connected to the AC output 30. In this case, the DC/AC inverter 1 stops working, the metal-oxide-semiconductor field-effect transistor T3 is turned off such that the boost circuit 4 stops working, and the bi-directional 9 is controlled to work in pulse width modulation mode, providing pulse width modulation signals to the metal-oxide-semiconductor field-effect transistors T1 and T2 to make them turn on at the same time or turn off at the same time. When the metal-oxide-semiconductor field-effect transistors T1 and T2 are turned off at the same time, the full-bridge rectifying circuit 6 and full-bridge rectifying circuit 11 form a continuous current circuit, the rectifying and buck circuit 15 rectifies the AC of the AC input 20 and decreases the voltage of the AC, thus a pulsating DC is obtained at the input of the full-bridge inverter 5, and the full-bridge inverter 5 is controlled to work in pulse width modulation mode so as to provide the required AC to the AC output 30. As a result, a stable voltage is outputted. By making the metal-oxide-semiconductor field-effect transistors T1 and T2 work in pulse width modulation mode and turn on or turn off at the same time, the controlling method is simple and the power consumption of the bi-directional switch 9 can be reduced. When the bi-directional switch 9 is controlled to work in pulse width modulation mode, during the positive half cycle of AC of the AC input 20, the metal-oxide-semiconductor field-effect transistor T2 may be turned off and a pulse width modulation signal may be provided to the metal-oxide-semiconductor field-effect transistor T1, and during the negative half cycle of AC of the AC input 20, the metal-oxide-semiconductor field-effect transistor Ti may be turned off and a pulse width modulation signal may be provided to the metal-oxide-semiconductor field-effect transistor T2. In another embodiment of the present invention, the charger 2 may be utilized to charge the chargeable and dischargeable device 19. When the voltage across the chargeable and dischargeable device 19 is equal to the rated voltage or a percentage of the rated voltage, the charger 2 stops working.

Figure 6:
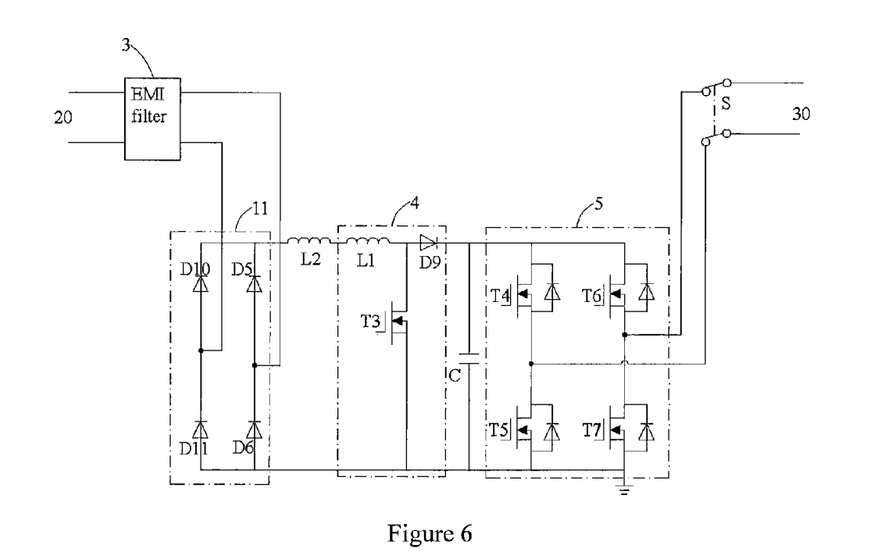
FIG. 6 is an equivalent circuit diagram of the line interactive UPS shown in FIG. 2 in the line mode to increase voltage.

FIG. 6 is an equivalent circuit diagram of the line interactive UPS shown in FIG. 2 in the line mode to increase voltage. When the voltage of the AC input 20 is less than the required voltage for the AC output 30, the switch S is controlled such that the output of the full-bridge inverter 5 is connected to the AC output 30, the DC/AC inverter 1 stops working, and the bi-directional switch 9 is always in the conducting state. The rectifying and buck circuit 21 only rectifies the AC of the AC input 20, which is converted to DC after being rectified by the full-bridge rectifying circuit 11. The boost circuit 4 is controlled to work in pulse width modulation mode so as to obtain a voltage-increased pulsating DC at the output of the boost circuit 4. The full-bridge inverter 5 is controlled to work in pulse width modulation mode so as to obtain the required AC at the AC output 30. In another embodiment of the present invention, the charger 2 may be utilized to charge the chargeable and dischargeable device 19. When the voltage across the chargeable and dischargeable device 19 is equal to the rated voltage or a percentage of the rated voltage, the charger 2 stops working.

Figure 7:
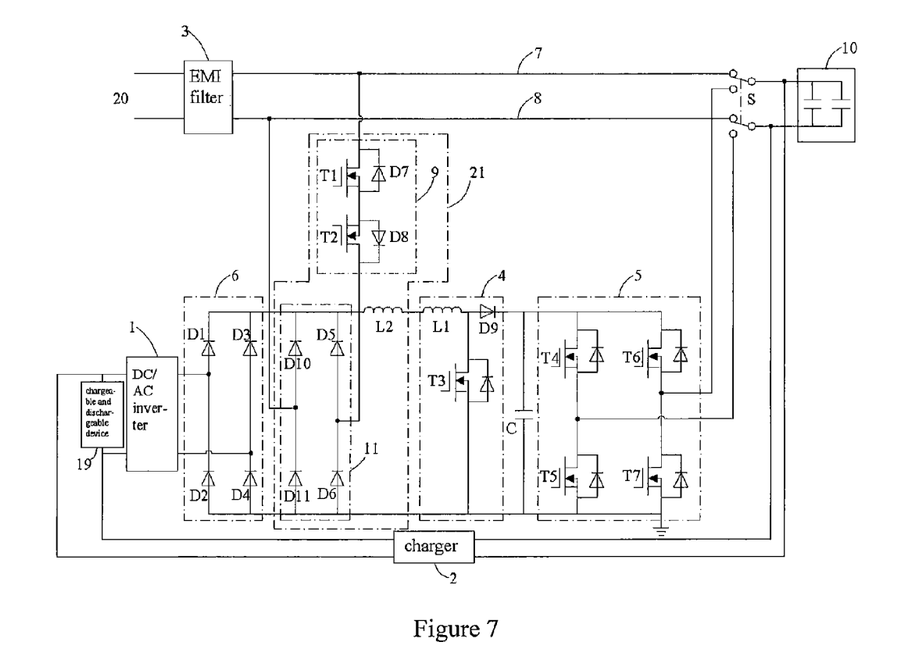
FIG. 7 is a circuit diagram of the line interactive UPS shown in FIG. 2 connected to a capacitive load.

FIG. 7 is a circuit diagram of the line interactive UPS shown in FIG. 2 connected to a capacitive load, wherein the power required by the capacitive load is less than the power provided by the AC input 20. In another embodiment of the present invention, the circuit of FIG. 7 may further comprise a detecting device for detecting load conditions, for example voltage and power required by the load, and the type of the load, and transmitting a detection signal to a controlling device of the UPS, which controls the operating mode of the circuit according to the detection signal. Those skilled in the art can understand that the detecting device may be any form that achieves the above function. When the power required by the capacitive load 10 is less than the power provided by the AC input 20, at the peak point of sine wave of AC of the AC input 20, the stored energy in the capacitive load 10 will be very large, causing waveform distortion across the capacitive load 10 and a large amount of inrush current flowing into the full-bridge inverter 5, which are likely to damage the full-bridge inverter 5 and reduce life span of the full-bridge inverter 5. For this case, the present invention also provides an embodiment for solving the above problem. Below, the embodiment is described in detail with reference to FIGS. 8-12.

Figure 8:
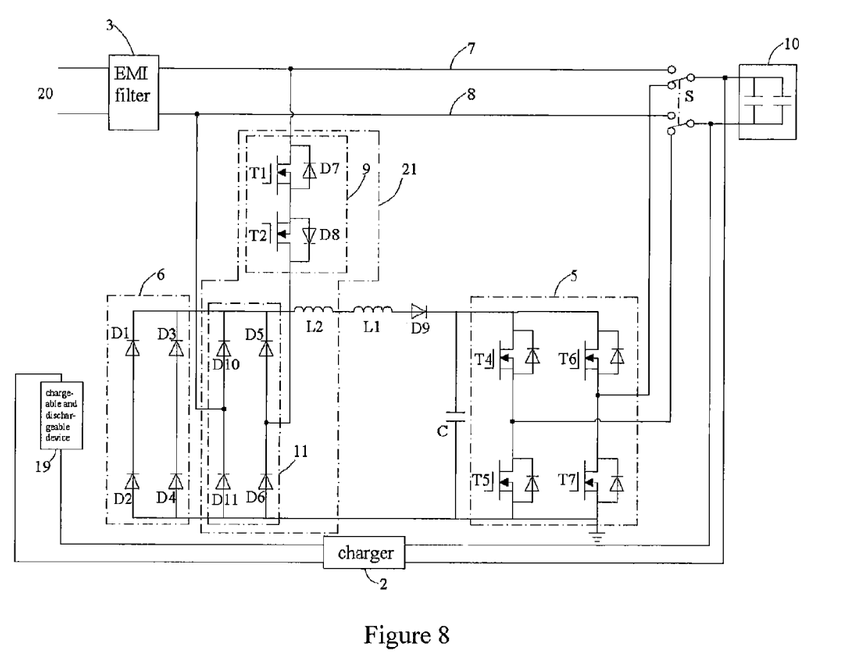
FIG. 8 is an equivalent circuit diagram of the line interactive UPS shown in FIG. 7 in the line mode to decrease voltage, wherein the capacitive load is powered by the AC output.

FIG. 8 is an equivalent circuit diagram of the line interactive UPS shown in FIG. 7 in the line mode to decrease voltage, wherein the capacitive load is powered by the AC input. When the voltage of the AC input 20 is greater than the required voltage for the AC output 30, since the power provided by the AC input 20 is greater than the power required by the capacitive load, the switch S is controlled such that the output of the full-bridge inverter 5 is connected to the AC output 30, the metal-oxide-semiconductor field-effect transistor T3 is turned off such that the boost circuit 4 stops working all the time, the charger 2 is controlled to charge the chargeable and dischargeable device 19, the DC/AC inverter 1 stops working, the bi-directional switch 9 is controlled to work in pulse width modulation mode so as to obtain a voltage-decreased pulsating DC at the input of the full-bridge inverter 5, and the full-bridge inverter 5 is controlled to work in pulse width modulation mode so as to obtain the required AC at the AC output 30, wherein the method for controlling the bi-directional switch 9 in FIG. 8 is the same as that in FIG. 5, and thus not discussed here.

Figure 9:
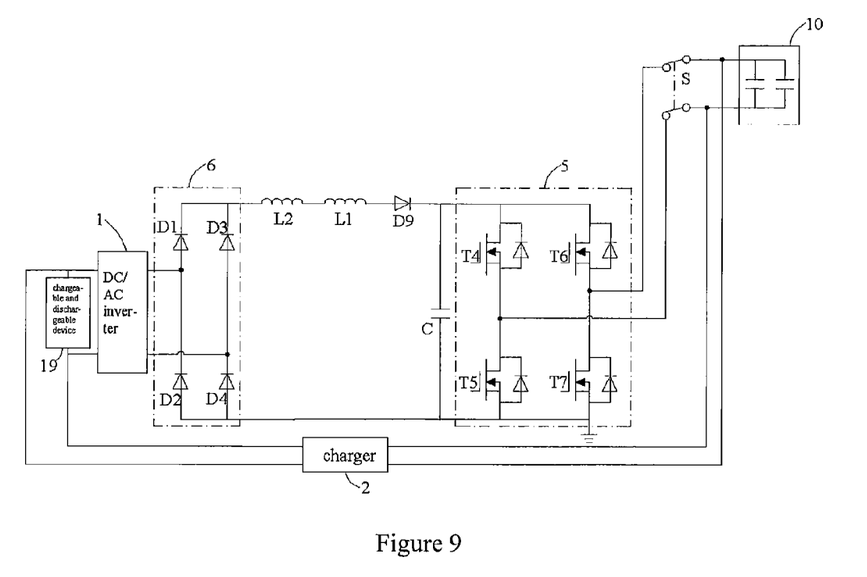
FIG. 9 is an equivalent circuit diagram of the line interactive UPS shown in FIG. 7 in the line mode to decrease voltage, wherein the capacitive load is powered by the chargeable and dischargeable device.
Figure 10:
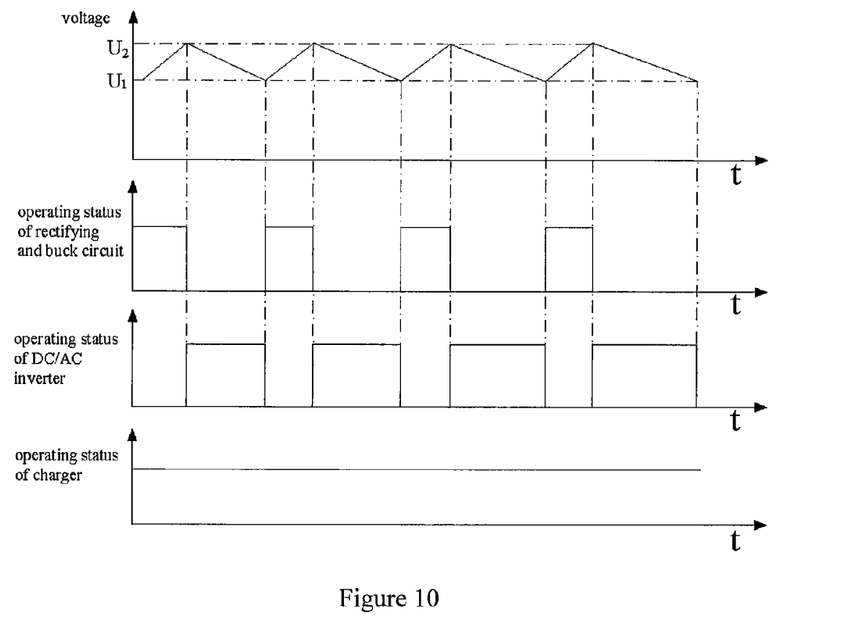
FIG. 10 is a timing diagram of a process implemented by the line interactive UPS shown in FIG. 7 in the line mode to decrease voltage.

FIG. 10 is a timing diagram of a process implemented by the line interactive UPS shown in FIG. 7 in the line mode to decrease voltage, wherein a high value of the rectifying and buck circuit operating status indicates that the bi-directional switch 9 works in pulse width modulation mode such that the rectifying and buck circuit 21 achieves the functions of rectifying and decreasing voltage at the same time, and a low value of the operating status indicates that the bi-directional switch 9 is in the off state all the time. In addition, a high value of DC/AC inverter operating status indicates that the DC/AC inverter 1 works in pulse width modulation mode, and a low value of the operating status indicates that the DC/AC inverter 1 stops working. During the operation of the circuit shown in FIG. 8, since the power provided by the AC input 20 is greater than the required power for the capacitive load 10, the charger 2 is controlled to charge the chargeable and dischargeable device 19 such that the voltage across the chargeable and dischargeable device 19 gradually increases from a first threshold voltage $U_1$ to a second threshold voltage $U_2$. During this period, the bi-directional switch 9 of the rectifying and buck circuit 21 works in pulse width modulation mode and the DC/AC inverter 1 stops working. When the voltage across the chargeable and dischargeable device 19 increases to the second threshold voltage $U_2$, the bi-directional switch 9 is disconnected, and an equivalent circuit is shown in FIG. 9. The DC/AC inverter 1 is controlled to work in pulse width modulation mode so as to convert a DC of the chargeable and dischargeable device 19 into an AC and output it. A pulsating DC is obtained at the input of the full-bridge inverter 5 after the AC is rectified by the full-bridge rectifying circuit 6. The full-bridge inverter 5 is controlled to work in pulse width modulation mode so as to output the required AC to the capacitive load 10. In the process of the chargeable and dischargeable device 19 supplying power to the capacitive load 10, the voltage across the chargeable and dischargeable device 19 gradually decreases from the second threshold voltage $U_2$. After the voltage across the chargeable and dischargeable device 19 decreases to the first threshold voltage $U_1$, the operation mode of the circuit is the same as that of the equivalent circuit shown in FIG. 8 again. After the voltage across the chargeable and dischargeable device 19 increases from the first threshold voltage $U_1$ to the second threshold voltage $U_2$, the operation mode of the circuit is the same as that of the equivalent circuit shown in FIG. 9 again. According to the controlling method of the circuits shown in FIGS. 8 and 9, the charger 2 recharges the chargeable and dischargeable device 19 by using a portion of the electrical energy at the AC input 20 when the AC input 20 provides electrical power to the AC output 30. After the voltage across the chargeable and dischargeable device 19 reaches a predetermined value, the AC input 20 is controlled not to provide electrical power to the AC output 30, and the chargeable and dischargeable device 19 is controlled to provide electrical power to the AC output 30. Therefore, a required sinusoidal voltage across the capacitive load 10 will be obtained, and the impact and influence caused by the inrush current to the full-bridge 5 is reduced.

Figure 11:
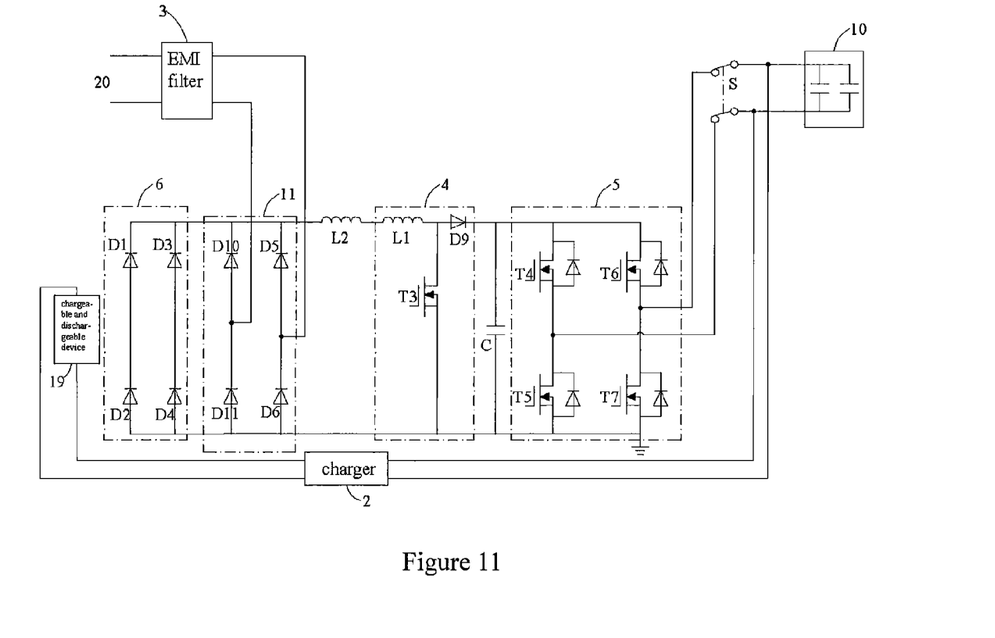
FIG. 11 is an equivalent circuit diagram of the line interactive UPS shown in FIG. 7 in the line mode to increase voltage, wherein the capacitive load is powered by the AC output.
Figure 12:
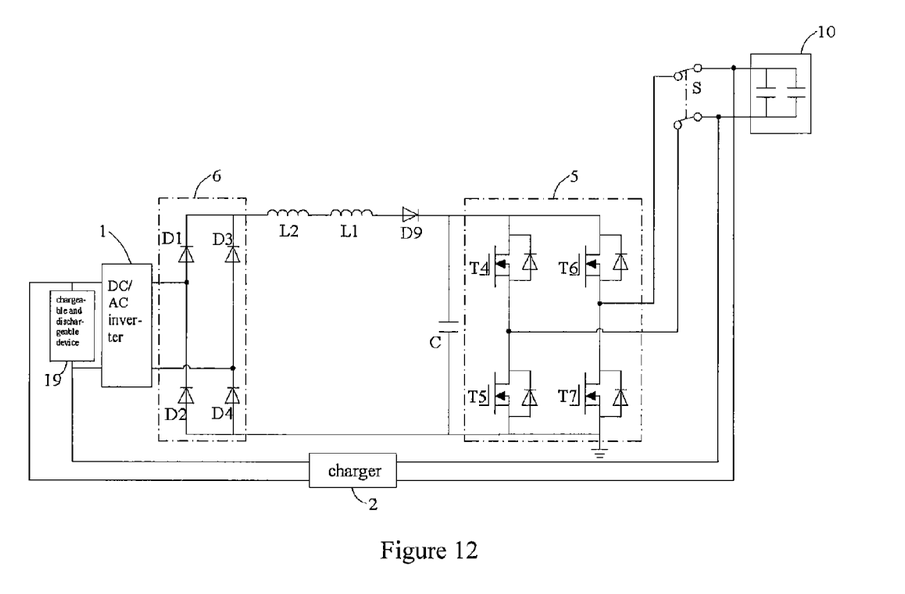
FIG. 12 is an equivalent circuit diagram of the line interactive UPS shown in FIG. 7 in the line mode to increase voltage, wherein the capacitive load is powered by the chargeable and dischargeable device.

FIG. 11 is an equivalent circuit diagram of the line interactive UPS shown in FIG. 7 in the line mode to increase voltage, wherein the capacitive load is powered by the AC output. When the voltage of the AC input 20 is less than the required voltage for the AC output 30, since the power provided by the AC input 20 is greater than the required power for the capacitive load 10, the switch S is controlled such that the output of the full-bridge inverter 5 is connected to the AC output 30, the charger 2 is controlled to charge the chargeable and dischargeable device 19 such that the voltage across the chargeable and dischargeable device 19 gradually increases from the first threshold voltage $U_1$ to the second threshold voltage $U_2$. The bi-directional switch 9 is in the on state (i.e., equivalent to a wire), the boost circuit 4 works in pulse width modulation mode and the DC/AC inverter 1 stops working. An equivalent circuit during this period is shown in FIG. 11. After the voltage across the chargeable and dischargeable device 19 increases to the second threshold voltage $U_2$, the bi-directional switch 9 is turned off, and the metal-oxide-semiconductor field-effect transistor T3 is turned off such that the boost circuit 4 stops working. An equivalent circuit at this time is shown in FIG. 12. The DC/AC inverter 1 is controlled to work in pulse width modulation mode so as to convert DC of the chargeable and dischargeable device 19 into AC. A pulsating DC is obtained at the input of the full-bridge inverter 5 after the AC is rectified by the full-bridge rectifying circuit 6. The full-bridge inverter 5 is controlled to work in pulse width modulation mode so as to output the required AC to the capacitive load 10. In the process of the chargeable and dischargeable device 19 supplying power to the capacitive load 10, the voltage across the chargeable and dischargeable device 19 gradually decreases from the second threshold voltage $U_2$. After the voltage across the chargeable and dischargeable device 19 decreases to the first threshold voltage $U_1$, the operation mode of the circuit is the same as that of the equivalent circuit shown in FIG. 11 again. After the voltage across the chargeable and dischargeable device 19 increases from the first threshold voltage $U_1$ to the second threshold voltage $U_2$, the operation mode of the circuit is the same as that of the equivalent circuit shown in FIG. 12 again. According to the controlling method of the circuit shown in FIGS. 11 and 12, a required sinusoidal voltage across the capacitive load 10 will be obtained, and the impact and influence caused by the inrush current to the full-bridge 5 is reduced.

A timing diagram of a controlling method for boosting voltage in line mode based on the equivalent circuits shown in FIGS. 11 and 12 is similar to the timing diagram shown in FIG. 10, which is not discussed here. The difference is that the operating status of the rectifying and buck circuit in FIG. 10 is replaced by an operating status of a boost circuit, wherein a high value of the boost circuit operating status indicates that the bi-directional switch 9 is in on state and the boost circuit 4 works in pulse width modulation mode, and a low value of the boost circuit operating status indicates that the bi-directional switch 9 is in off state and the boost circuit 4 stops working.

In this embodiment, the chargeable and dischargeable device 19 provides power to the capacitive load 10 based on the same equivalent circuit diagram (i.e. FIG. 9 and FIG. 12) when the power provided by the AC input 20 is greater than the required power for the capacitive load 10.

According to the circuit shown in FIG. 2 and the above controlling method, since rectifying and decreasing an AC of the AC input 20 and decreasing an AC of the AC input 20 do not happen simultaneously during the operation of the circuit shown in FIG. 2, one of the inductors L1 and L2 can be removed. In addition, rectifying the AC outputted by the DC/AC by the full-bridge rectifying circuit 6 and rectifying the AC of the AC input 20 by the full-bridge rectifying circuit 11 do not happen simultaneously. Therefore, the full-bridge rectifying circuit 6 and full-bridge rectifying circuit 11 may share two diodes.

Figure 13:
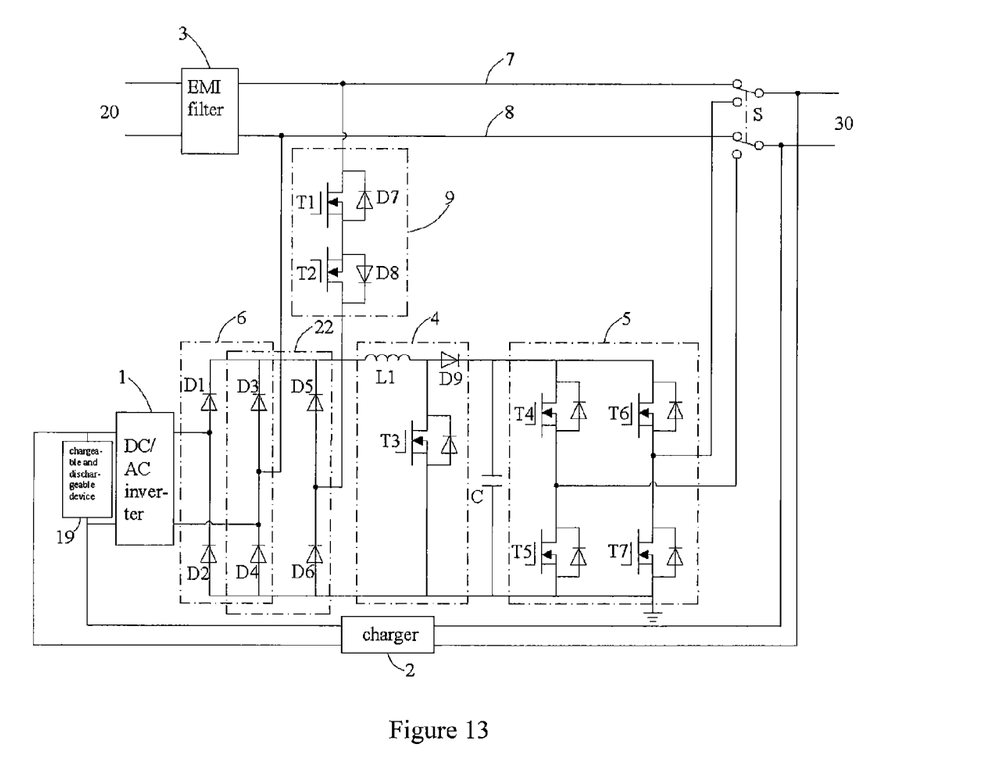
FIG. 13 is a circuit diagram of a line interactive UPS of a second embodiment of the present invention.

FIG. 13 is a circuit diagram of a line interactive UPS according to a second embodiment of the present invention, which is similar to that shown in FIG. 2. The difference is that FIG. 13 does not have the inductor L2 and the diodes D10 and D11. Diodes D3, D4, D5 and D6 constitute a full-bridge rectifying circuit 22. The cables 7 and 8 are connected to an input of the full-bridge rectifying circuit 22 via the bi-directional switch 9. The controlling method of the UPS shown in FIG. 13 is the same as that of the UPS shown in FIG. 2, which is not discussed here. By sharing the inductor L1, diode D3 and diode D4, the line interactive UPS of the present embodiment has fewer components, reduced cost and lower energy consumption.

Figure 14:
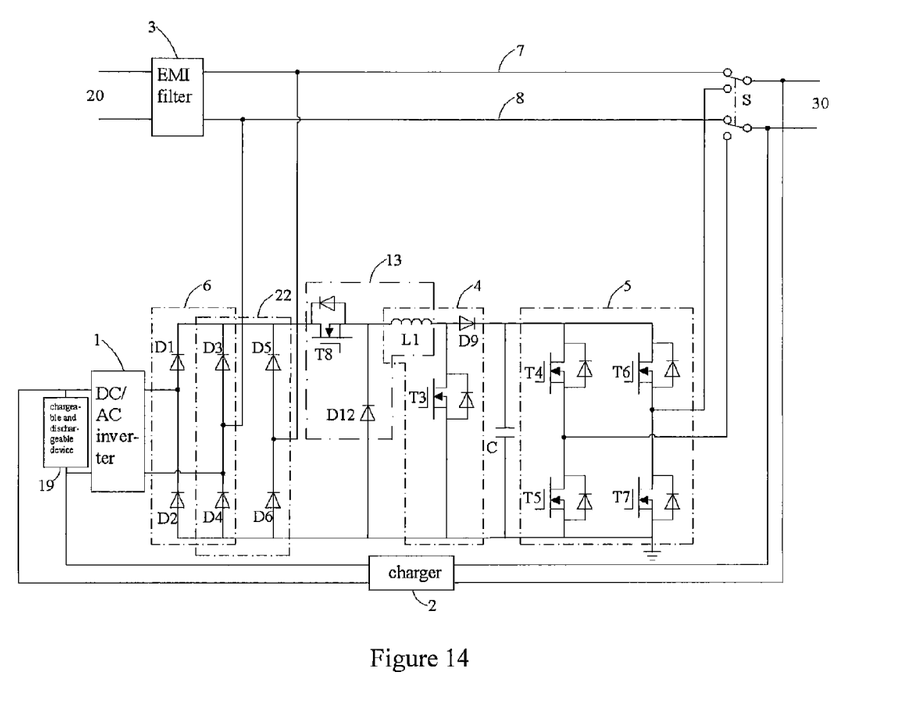
FIG. 14 is a circuit diagram of a line interactive UPS of a third embodiment of the present invention.

FIG. 14 is a circuit diagram of a line interactive UPS according to a third embodiment of the present invention, which is similar to that shown in FIG. 13. The difference is that FIG. 14 does not have the bi-directional switch 9, but comprises a metal-oxide-semiconductor field-effect transistor T8 and a diode D12, and the cable 7 is directly connected to the anode of the diode D5. The metal-oxide-semiconductor field-effect transistor T8, diode D12 and inductor L1 constitute a buck circuit 13, wherein the buck circuit 13 and the boost circuit 4 share the inductor L1. The full-bridge rectifying circuit 22 and buck circuit 13 constitute a rectifying and buck circuit for rectifying and decreasing the AC of the AC input 20. By sharing the inductor L1, diode D3 and diode D4, the line interactive UPS of the present embodiment has fewer components and reduced cost. In other embodiments of the present invention, the buck circuit 13 and boost circuit 4 may not share the inductor L1.

Those skilled in the art will appreciate that the metal-oxide-semiconductor field-effect transistors of the above embodiments can be replaced with IGBT.

Although the present invention has been described with reference to preferred embodiments, the present invention is not limited to the embodiments described herein. And the features and operation of the invention as described is susceptible to various modifications and alterations, without departing from the scope of the invention.

The invention claimed is:

1. A line interactive UPS, comprising:
   an AC input and an AC output;
   a chargeable and dischargeable device;
   a DC/AC inverter, an input of which is connected to the chargeable and dischargeable device;
   a rectifying circuit, an input of which is connected to an output of the DC/AC inverter;
   a full-bridge inverter, an input of which is connected to an output of the rectifying circuit;
   a capacitor connected to the input of the full-bridge inverter;
   a switch configured to connect the AC input or an output of the full-bridge inverter to the AC output;
   a charger, an input of which is connected to the AC output, and an output of which is connected to the chargeable and dischargeable device;
   a boost circuit, an output of which is connected to the input of the full-bridge inverter; and
   a rectifying and buck circuit configured to provide a rectified output voltage with a variable magnitude, wherein an input of the rectifying and buck circuit is connected to the AC input, and the rectifying and buck circuit is operative to selectively provide a pulsating DC voltage to the boost circuit and the full-bridge inverter.

2. The line interactive UPS according to claim 1, wherein the rectifying and buck circuit comprises a bi-directional switch, a first full-bridge rectifying circuit and an inductor, wherein the first full-bridge rectifying circuit includes an input and an output, the AC input is connected to the input of the first full-bridge rectifying circuit via the bi-directional switch, and a terminal of the inductor is connected to a positive of the output of the first full-bridge rectifying circuit.

3. The line interactive UPS according to claim 2, wherein the bi-directional switch comprises a first metal-oxide-semiconductor field-effect transistor having an anti-parallel diode and a second metal-oxide-semiconductor field-effect transistor having an anti-parallel diode, a source of the first metal-oxide-semiconductor field-effect transistor is connected to a source of the second metal-oxide-semiconductor field-effect transistor, a drain of the second metal-oxide-semiconductor field-effect transistor is connected to an anode of a third diode, and a drain of the first metal-oxide-semiconductor field-effect transistor is connected to a terminal of the AC input.

4. The line interactive UPS according to claim 2, wherein the inductor is a part of the boost circuit.

5. The line interactive UPS according to claim 1, wherein the rectifying and buck circuit comprises a first full-bridge rectifying circuit and a buck circuit, the first full-bridge rectifying circuit includes an input and an output, the input of the first full-bridge rectifying circuit is connected to the AC input, the output of the first full-bridge rectifying circuit is connected to an input of the buck circuit, and an output of the buck circuit acts as an output of the rectifying and buck circuit.

6. The line interactive UPS according to claim 2, wherein the rectifying circuit comprises a second full-bridge rectifying circuit, and the first full-bridge rectifying circuit and the second full-bridge rectifying circuit share two diodes.

7. The line interactive UPS according to claim 1, wherein the chargeable and dischargeable device comprises a protection switch, a storage capacitor and a chargeable and dischargeable battery, wherein the protection switch and the chargeable and dischargeable battery are connected in series in parallel with the storage capacitor.

8. The line interactive UPS according to claim 1, wherein, when a magnitude of a voltage at the AC input is greater than a desired magnitude, the switch connects the output of the full-bridge inverter to the AC output, the rectifying and buck circuit provides a pulsating DC voltage to the full-bridge inverter, and the full-bridge inverter operates in a pulse width modulation mode so as to provide an AC voltage at the AC output with the desired magnitude.

9. The line interactive UPS according to claim 1, wherein, when a magnitude of a voltage at the AC input is less than a desired magnitude, the switch connects the output of the full-bridge inverter to the AC output, the rectifying and buck circuit provides a pulsating DC to the boost circuit, and the boost circuit and the full-bridge inverter operate in a pulse width modulation mode so as to provide an AC voltage at the AC output with the desired magnitude.

10. The line interactive UPS according to claim 1, wherein, when a magnitude of a voltage of the AC input is greater than a desired magnitude and the AC output is connected to a capacitive load requiring a power which is less than the power provided by the AC input, the switch connects the output of the full-bridge inverter to the AC output, the full-bridge inverter operates in a pulse width modulation mode, and the charger charges the chargeable and dischargeable device, and wherein the line interactive UPS alternately performs the following:
   causing the rectifying and buck circuit to provide a pulsating DC to the full-bridge inverter, such that a voltage across the chargeable and dischargeable device increases from a first threshold voltage to a second threshold voltage which is greater than the first threshold voltage, and providing an AC voltage at the AC output with the desired magnitude; and
   causing the DC/AC inverter to operate in a pulse width modulation mode, such that the voltage across the chargeable and dischargeable device decreases from the second threshold voltage to the first threshold voltage and provides an AC voltage at the AC output with the desired magnitude.

11. The line interactive UPS according to claim 1, wherein, when a magnitude of an AC voltage at the AC input is less than a desired magnitude and the AC output is connected to a capacitive load requiring a power which is less than the power provided by the AC input, the switch connects the output of the full-bridge inverter to the AC output, the full-bridge inverter operates in a pulse width modulation mode, and the charger charges the chargeable and dischargeable device, and the line interactive UPs alternately performs the following:
   causing the rectifying and buck circuit to provide a pulsating DC voltage to the boost circuit, such that the voltage across the chargeable and dischargeable device increases from a first threshold voltage to a second threshold voltage which is greater than the first threshold voltage, the boost circuit operates in a pulse width modulation mode and provides an AC voltage at the AC output having the desired magnitude; and causing the DC/AC inverter to operate in a pulse width modulation mode, such that the voltage across the chargeable and dischargeable device decreases from the second threshold voltage to the first threshold voltage and provides an AC voltage at the AC output having the desired magnitude.

12. A UPS comprising:
an AC input;
an AC output;
an energy storage device;
a first inverter having an input coupled to the energy storage device;
a rectifier having an input coupled to an output of the first inverter;
a second inverter having an input coupled to an output of the rectifier;
a first switch configured to selectively couple the AC input and an output of the second inverter to the AC output;
a boost circuit having an output coupled to the input of the second inverter;
a rectifying and buck circuit having an input coupled to the AC input; and
a second switch configured to selectively couple an output of the rectifying and buck circuit to an input of the boost circuit or the input of the second inverter.

13. The UPS of claim 12, further comprising a charger having an input coupled to the AC output and an output coupled to the energy storage device.

14. The UPS of claim 12, configured to change states of the first and second switches based on a magnitude of an AC voltage at the AC input.

15. The UPS of claim 12, wherein the second switch couples the output of the rectifying and buck circuit to the input of the boost circuit when a magnitude of an AC voltage at the AC input is less than a predetermined magnitude and wherein the second switch couples the output of the rectifying and buck circuit to the input of the second inverter when the magnitude of the AC voltage at the AC input is greater than the predetermined magnitude.

* * * * *